United States Patent
Yoon et al.

(10) Patent No.: US 9,421,906 B2
(45) Date of Patent: Aug. 23, 2016

(54) CONTROL APPARATUS OF DIRECTIONAL INDICATOR LAMP FOR VEHICLE AND METHOD THEREOF

(71) Applicant: HYUNDAI MOTOR COMPANY, Seoul (KR)

(72) Inventors: Ilo Yoon, Seoul (KR); Jisoo Park, Seoul (KR); Ho Deuk Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 2 days.

(21) Appl. No.: 14/549,340

(22) Filed: Nov. 20, 2014

(65) Prior Publication Data

US 2016/0031365 A1 Feb. 4, 2016

(30) Foreign Application Priority Data

Jul. 29, 2014 (KR) ........................ 10-2014-0096509

(51) Int. Cl.
*B60Q 1/34* (2006.01)
*B60Q 1/38* (2006.01)

(52) U.S. Cl.
CPC ........................................ *B60Q 1/38* (2013.01)

(58) Field of Classification Search
CPC ........ B60Q 11/007; B60Q 1/305; B60Q 1/38; B60Q 1/46; B62D 15/02; G01D 5/165; G01S 13/92; G01S 13/9303; G06Q 10/06; G06Q 10/087; G06Q 10/10; G06Q 10/20; G06Q 20/10; G06Q 30/0222; G06Q 30/0283

USPC ........ 340/478, 471, 472, 661, 664, 458, 662, 340/660, 663, 475, 468, 488, 464–465
See application file for complete search history.

(56) References Cited

U.S. PATENT DOCUMENTS

| | | | |
|---|---|---|---|
| 5,805,061 A * | 9/1998 | Fritz | B60Q 1/305 340/471 |
| 2005/0024852 A1* | 2/2005 | Wong | H05B 33/0857 362/103 |
| 2006/0133103 A1 | 6/2006 | Muhlbaier et al. | |
| 2010/0001944 A1* | 1/2010 | Seong | G09G 3/342 345/102 |
| 2010/0308739 A1* | 12/2010 | Shteynberg | H05B 33/083 315/193 |
| 2013/0127340 A1* | 5/2013 | Huhn | B60Q 1/0041 315/77 |

FOREIGN PATENT DOCUMENTS

| | | | |
|---|---|---|---|
| JP | 2517334 | * | 11/1996 |
| JP | 2517334 Y2 | | 11/1996 |
| JP | 2001-117535 A | | 4/2001 |
| KR | 10-1258064 B1 | | 4/2013 |

* cited by examiner

*Primary Examiner* — Daniel Previl
(74) *Attorney, Agent, or Firm* — McDermott Will & Emery LLP

(57) ABSTRACT

A system for controlling a directional indicator of a vehicle includes the directional indicator including a plurality of lamps turned on at different threshold voltages and indicating a turning direction of the vehicle. A controller is configured to change an input voltage that is supplied to the lamps to sequentially turn on/off the lamps.

8 Claims, 3 Drawing Sheets

CONTROL APPARATUS OF DIRECTIONAL INDICATOR LAMP FOR VEHICLE AND METHOD THEREOF

CROSS-REFERENCE TO RELATED APPLICATION

This application claims the benefit of priority to Korean Patent Application No. 10-2014-0096509 filed in the Korean Intellectual Property Office on Jul. 29, 2014, the entire contents of which are incorporated herein by reference.

TECHNICAL FIELD

The present disclosure relates to a system for controlling a directional indicator of a vehicle and a method thereof. More particularly, the present disclosure relates to a system for controlling a directional indicator which can minimize the number of parts and reduce manufacturing cost, and a method of controlling the directional indicator.

BACKGROUND

Directional indicators on vehicles indicate turning directions of the vehicles. The directional indicators indicate the turning directions of the vehicles by turning on/off a lamp.

Recently, directional indicators comprising a plurality of lamps to improve visibility by sequentially turning on/off the lamps have been developed.

However, those directional indicators of the related art require a separate microprocessor for controlling the lamps, resulting in an increase in manufacturing cost.

Further, since a microprocessor and a plurality of lamps need to be electrically connected to each other by pins, size of a semiconductor package increases.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system for controlling a directional indicator of a vehicle having advantages of reducing manufacturing cost and size of a semiconductor package.

According to an exemplary embodiment of the present inventive concept, a system for controlling a directional indicator includes the directional indicator having a plurality of lamps turned on at different threshold voltages and indicating a turning direction of a vehicle. A controller is configured to change an input voltage supplied to the lamps to sequentially turn on/off the lamps.

The lamps may be sequentially arranged in accordance with magnitudes of the threshold voltages for each of the lamps.

The controller may sequentially increase or decrease the supplied input voltage to turn on or off the lamps.

A resistor that adjusts luminous intensity of the lamps may be connected in series to each of the lamps.

According to another exemplary embodiment of the present inventive concept, a method of controlling a directional indicator include receiving a signal for turning on a directional indicator having a plurality of lamps that turn on at different threshold voltages, by a controller. An input voltage that is supplied to the lamps is changed to sequentially turn on/off, by means of the controller.

The lamps may be sequentially arranged in accordance with magnitudes of the threshold voltages for each of the lamps.

The method may further include sequentially increasing or decreasing the input voltage that is supplied to the lamps.

According to the system for controlling a directional indicator of the exemplary embodiment of the present inventive concept, it is possible to minimize the number of pins which electrically connects a microprocessor and a plurality of lamps to each other, such that it is possible to reduce manufacturing cost and size of a semiconductor package.

BRIEF DESCRIPTION OF THE DRAWINGS

The drawings are provided for reference in describing exemplary embodiments of the present inventive concept, and the spirit of the present disclosure should not be construed only by the accompanying drawings.

FIG. 3 is a graph when a plurality of lamps of a system for controlling a directional indicator of a vehicle according to an exemplary embodiment of the present inventive concept turns on.

DETAILED DESCRIPTION OF THE EMBODIMENTS

Figure 1:
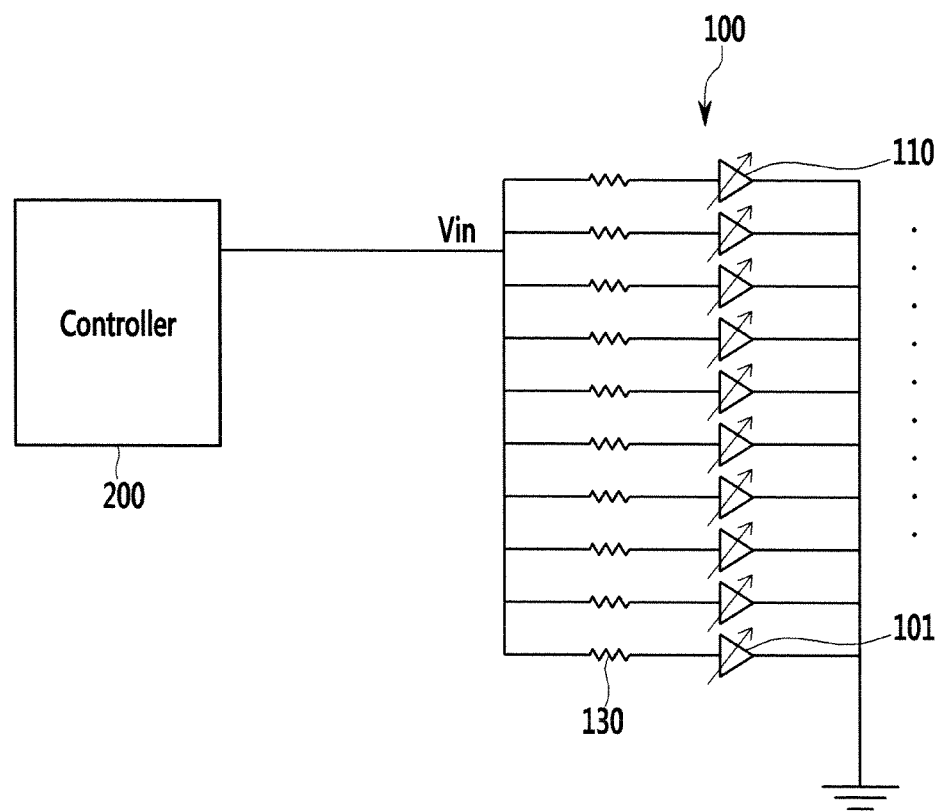
FIG. 1 is a conceptual diagram showing a configuration of a system for controlling a directional indicator of a vehicle according to an exemplary embodiment of the present inventive concept.
Figure 2:
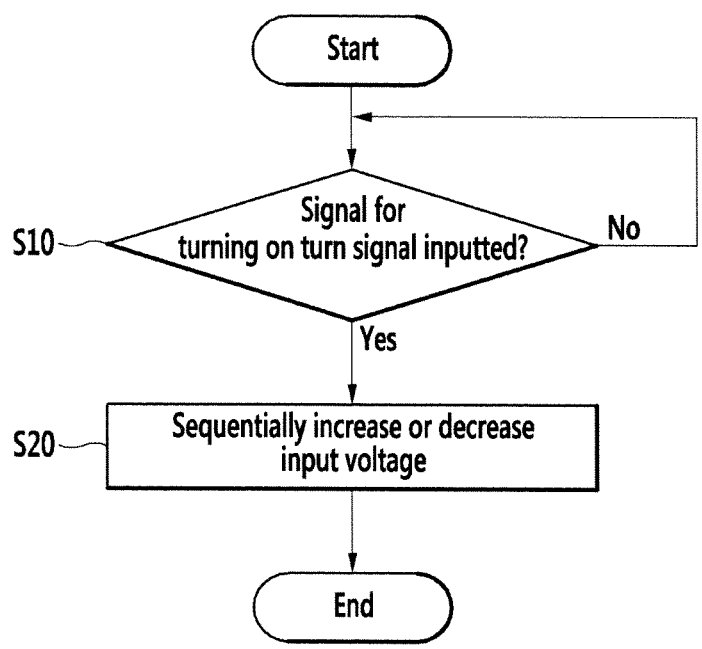
FIG. 2 is a flowchart illustrating a method of controlling a directional indicator of a vehicle according to an exemplary embodiment of the present inventive concept.

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

The parts not related to the description of the exemplary embodiments are not shown to make the description clear and like reference numerals designate like elements throughout the specification.

The sizes and thicknesses of the configurations shown in the drawings are provided selectively for the convenience of description, such that the present disclosure is not limited to those shown in the drawings, and the thicknesses are exaggerated to make some parts and regions clear.

Hereinafter, a system for controlling a directional indicator of a vehicle according to an exemplary embodiment of the present inventive concept will be described in detail with reference to the accompanying drawings.

FIG. 1 is a conceptual diagram showing a configuration of a system for controlling a directional indicator of a vehicle according to an exemplary embodiment of the present inventive concept.

As shown in FIG. 1, a system for controlling a turn signal of a vehicle according to an exemplary embodiment of the present inventive concept includes a directional indicator 100 composed of a plurality of lamps 101, 102, 103, 104, 105, 106, 107, 108, 109, and 110 for indicating a turning direction of a vehicle and a controller 200 controlling the directional indicator 100.

The lamps 102, 103, 104, 105, 106, 107, 108, 109, and 110 of the directional indicator 100 are turned on at different threshold voltages Vth. That is, assuming that there are n pieces of lamps, threshold voltages for turning on the lamps are different.

For example, assuming that there are ten lamps, the threshold voltages for turning on the lamps may be set as in the following Table 1.

TABLE 1

| lamp | threshold voltage (Vth) |
|---|---|
| first lamp | 0.5 V |
| second lamp | 0.7 V |
| third lamp | 0.9 V |
| fourth lamp | 1.1 V |
| fifth lamp | 1.3 V |
| sixth lamp | 1.5 V |
| seventh lamp | 1.7 V |
| eighth lamp | 1.9 V |
| ninth lamp | 2.1 V |
| tenth lamp | 2.2 V |

As shown in Table 1, the threshold voltages for turning on the lamps may be set to sequentially increase.

The lamps may be sequentially arranged in accordance with the magnitudes of the threshold voltages. That is, the lamps may be arranged sequentially in order of the magnitudes of the threshold voltages from those having larger ones. In contrast, the lamps may be arranged sequentially in order of the magnitudes of the threshold voltages from those having smaller ones.

A resistor 130 that adjusts luminous intensities of the lamps may be connected in series to each of the lamps. Since the threshold voltages of the lamps are different, the luminous intensities of the lamps may be different when they are turned on. Therefore, it is possible to uniformly maintain the luminous intensities of the lamps by connecting the resistors 130 in series to the lamps.

The threshold voltages of the lamps may be set in a semiconductor process of producing the lamps.

In general, diodes in the lamps are produced in the semiconductor process, and the threshold voltages can be adjusted by adjusting the doping amount of semiconductors when the lamps are produced.

In detail, the threshold voltages can be changed by the following Equation 1, $$V_{th} = V_t \cdot \ln\left(\frac{N_d \cdot N_a}{ni^2}\right),$$ (Equation 1)

where Vth is a threshold voltage, Vt is a thermal voltage, Nd is the doping amount of a donor, Na is the doping amount of an acceptor, and ni is pure electron concentration.

As in Equation 1, it is possible to adjust the threshold voltages of the lamps by adjusting the doping amounts of diodes.

The controller 200 changes an input voltage Vin that is supplied to the lamps to sequentially turn on the lamps.

The controller 200 may be implemented by one or more processors operated by a predetermined program, in which the predetermined program is set to perform steps of a method of controlling the directional indicator 100 of a vehicle according to an exemplary embodiment of the present inventive concept.

The controller 200 can sequentially increase or decrease the input voltage that is supplied to the lamps to turn on or off the lamps.

That is, as the voltage that is supplied to the lamps is sequentially increased by the controller 200, the lamps are sequentially turned on in accordance with the magnitudes of the threshold voltages. On the contrary, as the voltage that is supplied to the lamps is sequentially decreased by the controller 200, the lamps are sequentially turned off in accordance with the magnitudes of the threshold voltages.

Hereinafter, a method of controlling a directional indicator of a vehicle according to an exemplary embodiment of the present inventive concept is described in detail.

First, the controller 200 determines whether a signal for turning on the directional indicator 100 including a plurality of lamps, which turns on at different threshold voltages, has been inputted (S10). The signal for turning on the directional indicator 100 may be inputted in response to an operation signal of the directional indicator 100 by a driver.

When the signal for turning on the directional indicator 100 is inputted, the controller 200 changes an input voltage that is supplied to the lamps so that the lamps are sequentially turned on/off. In detail, the controller 200 sequentially increases or decreases the input voltage that is supplied to the lamps (S20).

Hereinafter, the operation of the system for controlling a directional indicator of a vehicle according to an exemplary embodiment of the present inventive concept is described in detail.

Figure 3:
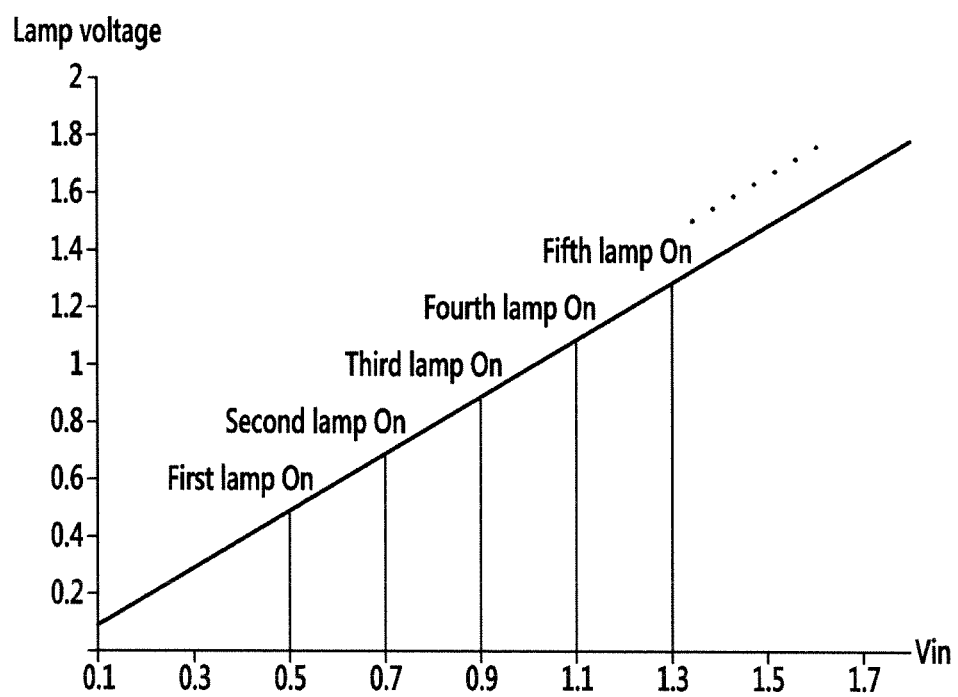

As shown in FIG. 3, when the controller 200 receives a signal for turning on the directional indicator 100, it sequentially increases an input voltage that is supplied to the lamps. As the voltage that is supplied to the lamps sequentially increases, the lamps are sequentially turned on in accordance with the magnitudes of the threshold voltages.

That is, the first lamp turns on when the input voltage that is supplied to the lamps reaches 0.5V. The second lamp turns on when the input voltage that is supplied to the lamps reaches 0.7 V. That is, the third lamp turns on, when the input voltage that is supplied to the lamps reaches 0.9 V. In this way, as the voltage that is supplied to the lamps sequentially increases, the ten lamps are sequentially turned on.

In contrast, the lamps are turned off in the reverse order of the turning-on of the lamps described above.

As described above, in the system for controlling the directional indicator of a vehicle according to the exemplary embodiment of the present inventive concept, since the lamps and the controller can be connected through one pin, the manufacturing cost of a vehicle can be reduced.

Further, since the lamps and the controller are connected through one pin, it is possible to minimize the size of a semiconductor package of the controller.

While this inventive concept has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling a directional indicator, comprising:
the directional indicator including a plurality of lamps which turn on at different threshold voltages, the directional indicator indicating a turning direction of a vehicle; and
a controller configured to change an input voltage supplied to the lamps to sequentially turn on/off the lamps, wherein the threshold voltages are adjusted by the following Equation:

$$V_{th} = V_t \cdot \ln\left(\frac{N_d \cdot N_a}{ni^2}\right),$$

where Vth is a threshold voltage, Vt is a thermal voltage, Nd is a doping amount of a donor, Na is a doping amount of an acceptor, and ni is a pure electron concentration.

2. The system of claim 1, wherein the lamps are sequentially arranged in accordance with magnitudes of the threshold voltages for each of the lamps.

3. The system of claim 2, wherein the controller is configured to sequentially increase or decrease the input voltage that is supplied to the lamps to turn on or off the lamps.

4. The system of claim 1, wherein a resistor that adjusts luminous intensity of the lamps is connected in series to each of the lamps.

5. A method of controlling a directional indicator of a vehicle, the method comprising steps of:
receiving, by a controller, a signal for turning on the directional indicator having a plurality of lamps that turn on at different threshold voltages; and
changing, by the controller, an input voltage that is supplied to the lamps to sequentially turned on/off the lamps,
wherein the threshold voltages are adjusted by the following Equation:

$$V_{th} = V_t \cdot \ln\left(\frac{N_d \cdot N_a}{ni^2}\right),$$

where Vth is a threshold voltage, Vt is a thermal voltage, Nd is a doping amount of a donor, Na is a doping amount of an acceptor, and ni is a pure electron concentration.

6. The method of claim 5, wherein the lamps are sequentially arranged in accordance with magnitudes of the threshold voltages for each of the lamps.

7. The method of claim 5, further comprising a step of:
sequentially increasing or decreasing, by the controller, the input voltage that is supplied to the lamps.

8. A non-transitory computer-readable recording medium comprising computer executable instructions which cause the controller to perform the method according to claim 5.

\* \* \* \* \*